United States Patent
Butussi et al.

(10) Patent No.: US 9,036,742 B2
(45) Date of Patent: May 19, 2015

(54) SIGNAL PROCESSING METHOD

(75) Inventors: Matteo Butussi, Grand-Saconnex (CH); Stefano Tomasin, Padua (IT)

(73) Assignee: ALi Europe Sarl, Plan-les-Ouates (CH)

( * ) Notice: Subject to any disclaimer, the term of this patent is extended or adjusted under 35 U.S.C. 154(b) by 7 days.

(21) Appl. No.: 14/005,415

(22) PCT Filed: Mar. 15, 2012

(86) PCT No.: PCT/EP2012/054527
§ 371 (c)(1),
(2), (4) Date: Dec. 19, 2013

(87) PCT Pub. No.: WO2012/123528
PCT Pub. Date: Sep. 20, 2012

(65) Prior Publication Data
US 2014/0321580 A1     Oct. 30, 2014

(30) Foreign Application Priority Data

Mar. 17, 2011 (EP) .................................. 11158717

(51) Int. Cl.
*H03D 1/00* (2006.01)
*H04L 27/26* (2006.01)
*H04L 27/34* (2006.01)

(52) U.S. Cl.
CPC ........ *H04L 27/2649* (2013.01); *H04L 27/3405* (2013.01); *H04L 27/2604* (2013.01)

(58) Field of Classification Search
USPC ......................................... 375/340, 341, 320
See application file for complete search history.

(56) References Cited

U.S. PATENT DOCUMENTS

| 8,625,723 B2* | 1/2014 | Lee et al. ........................ 375/341 |
| 2010/0074375 A1* | 3/2010 | Chen et al. .................... 375/340 |
| 2014/0270000 A1* | 9/2014 | Liu et al. ........................ 375/320 |
| 2014/0270014 A1* | 9/2014 | Xue et al. ........................ 375/341 |

OTHER PUBLICATIONS

Frame structure channel coding and modulation for a second generation digital terrestrial television broadcasting system(DVB-T2), ETSI EN 302 755 V1.1.1, Sep. 2009.
Implementation guidelines for a second generation digital terrestrial television broadcasting system, dvb document a133, (draft tr. 102 831 v1.1.1), Feb. 2009.
Peâ'rez-Calderoâ'n D et al: "Rotated constellation demapper for DVB-T2" The Institution of Engineering and Technology. Journal, vol. 47 , No. 1 , Jan. 6, 2011, pp. 31-32, ISSN: 1350-91 1X, DOI: 10.1 049IEL',20102682.

(Continued)

*Primary Examiner* — Eva Puente
(74) *Attorney, Agent, or Firm* — J.C. Patents

(57) ABSTRACT

A demapping scheme, having a low computational cost, suitable for any transmission in which only exhaustive demapping can guarantee good performance. The scheme, proposed in this document, can be used in any transmission based on no differential modulation. For example the proposed scheme can be directly applied to a transmission on flat fading AWGN channels or to a transmission on frequency selective channels after equalization or on each sub-carrier of an OFDM System. The proposed solution can be applied for the demapping of any communication system. The proposed scheme can be used for rotated and un-rotated constellation.

7 Claims, 2 Drawing Sheets

(56) References Cited

OTHER PUBLICATIONS

Meng Li et al: "Design of rotated QAM mapper/demapper for the DVBT2 standard", Signal Processing Systems, 2009. SIPS 2009. IEEE Workshop on, IEEE, Piscataway, NJ, USA, Oct. 7, 2009, pp. 18-23, ISBN : 978-1-4244-4335-2.

Onizawa T et al: "Limiting the constellations subjected to ML detection in OFDM/SDM systems", 2004 IEEE 60th Vehicular Technology Conference. vrc2004-Fall (tEEE CAT. No. o4CH37575) IEEE Piscataway, NJ, USA, vol. 5, Sep. 26, 2004, pp. 3368-3372, DOI : 1 0. 1 1 09/VETECF.2004.1 404688ISBN : 978-0-7803-8521-4.

\* cited by examiner

SIGNAL PROCESSING METHOD

REFERENCE DATA

This application claims priority of European patent application EP11158717 filed on 17 Mar. 2011, the contents whereof are hereby incorporated.

FIELD OF THE INVENTION

The present invention relates, in embodiments, to digital OFDM demodulators and processors, and to devices and methods to process digital OFDM signals like, but not exclusively, digital video broadcast signals.

RELATED ART

The new digital video broadcasting standard DVB-T2 includes the mandatory use of constellation rotation and cyclic Q delay (CRCQD) as a signal-space diversity technique.

After transmission on the channel by orthogonal frequency division multiplexing (OFDM), at the receiver the constellation does not exhibit the regular shape of QAM and in particular optimum demapping must be jointly performed on the real-imaginary axis for both hard and soft decoding. A joint demapping process requests a too high computational cost to be implemented in the receiver.

The new digital video broadcasting standard DVB-C2 includes the mandatory use of the 4096 QAM constellation. An exhaustive demapping process for a 4096QAM constellation has a too high computational cost to be implemented in the receiver.

The present invention relates to a demapping scheme, having a low computational cost, suitable for any transmission in which only exhaustive demapping can guarantee good performance. The proposed scheme can be used in any transmission based on no differential modulation. For example the proposed scheme can be directly applied to a transmission on flat fading AWGN channels or to a transmission on frequency selective channels after equalization or on each sub-carrier of an OFDM System. The proposed solution can be applied for the demapping of any communication system. The proposed scheme can be used for rotated and un-rotated constellation.

The method and system of the present invention are suitable for DVB-T2 and DVB-C2. Nevertheless, in the following, for the sake of simplicity only the T2 System, based on rotated constellation, will be taken into account. According to an aspect of the invention, only a subset of the constellation points close to the received samples is considered for demapping. Following another approach, the received sample is first scaled by the OFDM channel gain on the real and imaginary components, then counter-rotated and lastly a regular QAM demapper is applied. The proposed methods are compared with existing techniques both in terms of complexity and performance over reference DVB-T2 channels.

The publication "Frame structure channel coding and modulation for a second generation digital terrestrial television broadcasting system (DVB-T2), ETSI EN 302 755 V1.1.1, September 2009. The next generation of the digital video broadcasting standard for terrestrial transmissions" has introduced a number of new technological features, among which we mention new physical layer signalling, new tools for channel estimation and use of multiple antennas. Constellation rotation and cyclic Q delay (CRCQD) has been introduced in order to obtain signal-space diversity (SSD). SSD is implemented by CRCQD in two steps: 1) QAM symbols are rotated by a fixed angle and 2) the real and imaginary parts of each rotated symbol are transmitted on two different flat fading channels. The spectral efficiency is the same as for QAM transmission, since in step 2) two real and imaginary components belonging to different rotated QAM symbols can be combined for a transmission on a single complex channel.

The publication "*Implementation guidelines for a second generation digital terrestrial television broadcasting system*, dvb document a133, (draft tr. 102 831 v1.1.1), February 2009" describes how CRCQD improves performance especially when codes with high rates are used or when channel is subject to erasure phenomena. In this document each complex CRCQD symbol is transmitted on a different orthogonal frequency division multiplexing (OFDM) subcarrier. CRCQD has also been used in multiple input multiple output (MIMO) systems. More recently, combination of SSD with coded modulation systems has been investigated.

Due to the rotation and different allocation of real and imaginary components, the optimal decision regions for hard demapping do not have anymore the rectangular shape of QAM but they strongly depend on both the channel attenuations and rotation angle. Therefore, simple techniques used for hard and soft demapping of QAM symbols cannot be directly applied to CRCQD. Indeed, optimal performance for soft demapping are obtained by computing the distance of the received samples with respect to all the points of the constellation at the receiver input, with the two dimensional demapper (2D-DEM). However, for a large number of constellation points, i.e. using a 256 QAM as provided by DVB-T2, the complexity of the 2D-DEM has a significant impact on the receiver design, thus favoring the implementation of suboptimal demappers. For example a low complexity method based on the decomposition of the constellation into sub-regions corresponding approximately to each quadrant of the QAM constellation.

There is therefore a need for a process strategy to reduce the demapping computational cost.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
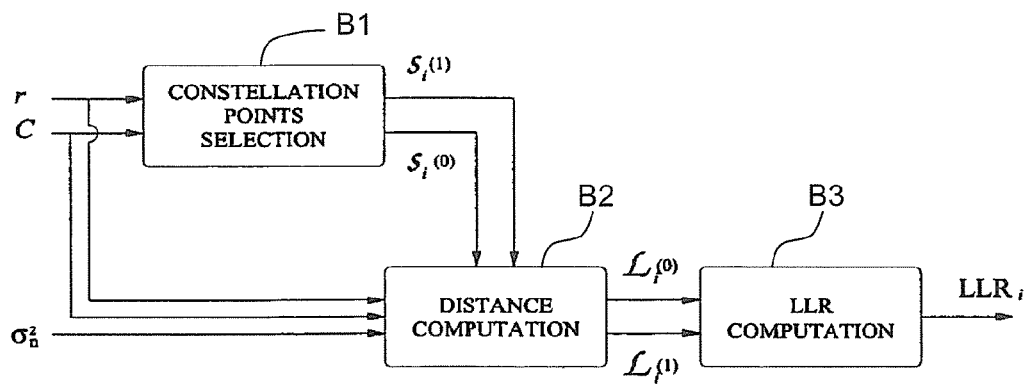
FIGS. 1 and 2 show in a schematic block fashion the demapping strategy according to an aspect of the invention.

According to an aspect of the present invention, the demapping process can be performed in three tasks: represented by blocks B1, B2, B3 of FIG. 1

B1 Constellation Point Selection

According to an important aspect of the invention, this block selects, from the constellation, a subset of points that are close to the received sample, based on predefined criteria. The sub-set computation is based on two inputs: the sample of the received signal and the channel state information. Many techniques can be used to compute the constellation sub-sets. According to a preferred variant, B1 generates two sub-sets for every transmitted bit. The two sub-sets, associated to i-th transmitted bit, are denoted by $S_i^{(0)}$ and $S_i^{(1)}$. $S_i^{(0)}$ is the set of the constellation points having an high probability of having been transmitted assuming the i-th transmitted bit equal to 0. Equivalently, $S_i^{(1)}$ is the set of the constellation points having an high probability of having been transmitted assuming the i-th transmitted bit equal to 1. As mentioned above, the $S_i^{(0)}$ and $S_i^{(1)}$ estimation is based on the received signal and on the channel state information. The techniques used for such computation can be suboptimal and then the computational cost can be significantly reduced. The cardinality of $S_i^{(0)}$ and $S_i^{(1)}$ is function of these techniques used in B1. The higher is the approximation quality, the smaller the constellation sub-sets can be.

B2 Distance Computation:

This block computes the probability to receive one of the constellation points of $S_i^{(0)}$ and $S_i^{(1)}$ given the received signal. Note that B2 computes this probability for all the points of $S_i^{(0)}$ and for all the points of $S_i^{(1)}$. This probability can also be expressed in form of distance. In this case B2 computes the distance between the received signal and all the points in $S_i^{(0)}$ and $S_i^{(1)}$. In this case the knowledge of the noise state information ($\sigma_n^2$) is not necessary. The B2 outputs are two sets of distances/probabilities. In the following, the two outputs will be denoted by $L_i^{(0)}$ and $L_i^{(1)}$. $L_i^{(1)}$ is the set of distances/probabilities of the received point respect all the constellation points of $S_i^{(0)}$. Equivalently, $L_i^{(1)}$ is the set of distances/probabilities of the received point with respect to all the constellation points of $S_i^{(1)}$.

B3 LLR Computation:

This block computes the Log-likelihood Ratio (LLR) for the i-th bit. The estimation is based one the two sets $L_i^{(1)}$ and $L_i^{(0)}$ and it can take into account the noise state information. There are many techniques to compute the LLR, in the following we will present one of them, also known as minimum distance algorithm.

A first inventive aspect, denoted inverse demapping, reverses the effects of channel and mapping, obtaining a regular QAM constellation with the addition of noise whose real and imaginary components are correlated and have different variance. A second independent inventive aspect, denoted one-dimensional demapping, instead significantly reduces the number of points over which the distance is computed by first approximately identifying the region to which the received sample belongs with a simple dichotomic search on the real axis.

In the following sections we describe the system model for CRCQD; the new demappers; and their performance and complexity are in comparison with existing techniques.

Notation: $j=\sqrt{-1}$ and for a complex number x, $x_R$ and $x_I$ denote its real and imaginary parts, respectively.

System Models

We consider a transmission where $N_b=\log_2 M$ bits $\{b_1, b_2, \ldots, b_{N_b}\}$ are mapped on a M-QAM symbol $s=s_R+js_I$ taken from the set $$C=\{x=\beta(x_R+jx_I): x_R, x_I=2c-\sqrt{M}+1, c=0,1,\ldots,\sqrt{M}-1\}, \quad (1)$$

where $\beta$ is an energy normalization factor (e.g. for 64-QAM $\beta=1/\sqrt{42}$). For CRCQD the symbol is first rotated by an angle $\alpha$ to obtain $$d=e^{j\alpha}s \quad (2)$$

and then its real and imaginary parts are transmitted on two different subcarriers of an OFDM systems.

Let $A \geq 0$ and $B \geq 0$ the amplitudes of the channel on the two subcarriers where s has been transmitted. At the receiver, after OFDM demodulation, the phase rotation introduced by the channel on each subcarrier is compensated, so that the received signal turns out to be a scaled (by A and B) version of the transmitted signal, with the addition of noise. By collecting the real and imaginary part from the two OFDM carriers into the complex number r we have $$r = r_R + jr_I \quad (3)$$
$$= A[\cos(\alpha)s_R - \sin(\alpha)s_I] + jB[\sin(\alpha)s_R + \cos(\alpha)s_I] + n,$$

where n is the zero-mean circularly symmetric complex noise term and we assumed that all the carriers have the same noise power $\sigma_n^2$. The constellation at the receiver input (relative to r) is defined by the set $$\overline{C}=\{\overline{c}=A[\cos(\alpha)x_R-\sin(\alpha)x_I]+jB[\sin(\alpha)x_R+\cos(\alpha)x_I]: x_R+jx_I \in C\}. \quad (4)$$

Log-Likelihood Computation

According to an aspect of the invention, the demappping is carried out based on the sample points of the sub-sets defined before, without using the points in the constellation not included in the sub-set. In order to perform soft-demapping we aim at computing the log-likelihood ratio ($llr_i$) of r, relative to each bit $b_i$, $i=1, 2, \ldots, n_b$. The exact computation of the LLR requires the evaluation of the distance of r from all the points of the constellation $\overline{C}$, i.e.

$$llr_i = \log \frac{\sum_{\hat{s} \in \overline{C}(b_i=1)} e^{-\frac{\|r-\hat{s}\|^2}{2\sigma_n^2}}}{\sum_{\hat{s} \in \overline{C}(b_i=0)} e^{-\frac{\|r-\hat{s}\|^2}{2\sigma_n^2}}}, \quad (5)$$

where $\overline{C}(b_i=k)$ is the subset of $\overline{C}$ containing all constellation points associated with $b_i=k$. 2D-DEM with exact LLR computation has a huge complexity, exponentially increasing with $N_b$. An approach to reduce complexity consists in approximating the LLR with its suboptimal minimum distance (SUB-MIN-DIST) version, computed using only the shortest distance of r from points in the selected constellation subset corresponding to the values '0' and '1' of a bit, i.e. defining $$\hat{s}_{i,k} = \text{argmin}_{s \in \overline{C}(b_i=k)}\{\|r-s\|^2\}. \quad (6)$$

and the normalized distances:

$$\mathcal{L}_i(0) = \frac{\|r-\hat{s}_{i,0}\|^2}{2\sigma_n^2}, \quad (7)$$

$$\mathcal{L}_i(1) = \frac{\|r-\hat{s}_{i,1}\|^2}{2\sigma_n^2},$$

the llr can then be written as $$\text{llr}_i \approx L_i(0) - L_i(1). \quad (8)$$

In this case, computing the llr boils down to the evaluation of the distance between r and the two closest points having the two values of bit i.

Two Dimension Demapper (2D-DEM)

While for QAM constellation the closest point is easily determined, for CRCQD the regions of points at minimum distance do not have a regular shape. For example, 64-QAM symbols with rotation coefficient $\alpha$=8.6 deg transmitted on a channel with A=10 and B=2 yield the regions at minimum distance from the constellation points shown in FIG. 3. The points denoted with x define the constellation $\overline{C}$. From this figure we note a rather irregular shape of the boundaries of the decision regions. In order to find the point at the minimum distance for CRCQD, we must compute the distance with respect to all the constellation points and then take the minimum, thus having a complexity similar to that of the exact LLR computation.

Low-Complexity Demappers

Figure 2:
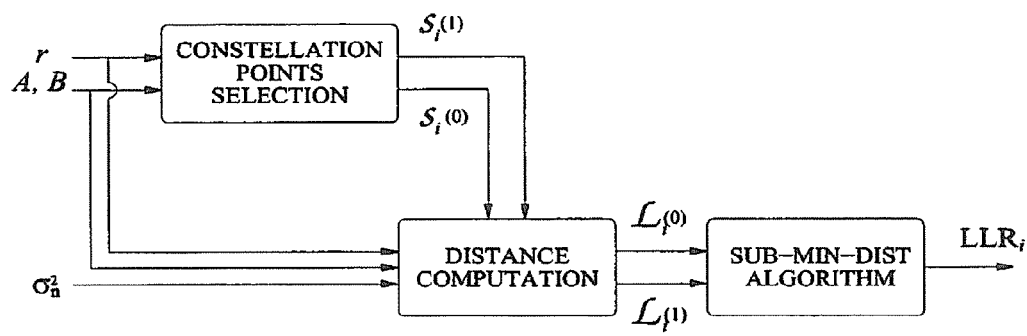

In this section we propose two methods for the approximate computation of the point at the minimum distance from r among those in the constellation subset $\overline{C}(b_i=k)$. Indeed we observe that the minimum distance points can be obtained by first identifying sub-sets $S_i(0)$ and $S_i(1)$ of the constellation points with the ith bit at 0 or 1 that are close to the receive sample. Then, distances are computed only within these sub-sets, i.e. the minimum distance point is now computed as $$\overline{s}_{i,k} = \text{argmin}_{s \in S_i(k)}\{\|r-s\|^2\}, \quad (9)$$

and the resulting architecture is shown in FIG. 2.

The sets $S_i(k)$ can be determined off-line according to any criterion. For example, we can first determine the constellation point $\overline{s}$ at minimum distance from r and the we may have stored beforehand in a table the list of constellation points that are closest to $\overline{s}$ for a given value of the ith bit, for all values of i.

Note that the 2D-DEM still fits within this model by setting $$S_i(0) = \overline{C}(b_1 = k) \text{ and } S_i(1) = \overline{C}(b_i = 1). \quad (10)$$

One Dimension Demapper (1D-DEM)

Preferably, the criteria adopted by the constellation point selector of FIGS. 1 and 2 include comparing one component of the sample, either the real component or the imaginary component, according to the channel conditions, with a set of thresholds. This first low-complexity approach is denoted one dimension demapper (1D-DEM). The idea of 1D-DEM is to divide the constellation plan into sectors limited by parallel lines along the imaginary axis and then compute the distance of r only with respect to points within the two sector closest to r.

Figure 3:
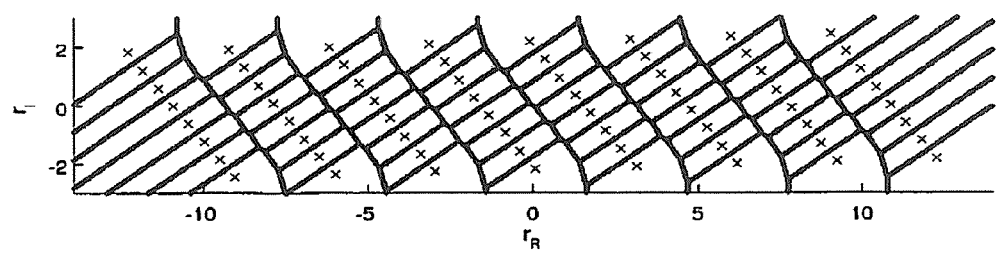
FIG. 3 shows the optimal decision regions for a 2-dim demapper for a CRCQD 64-QAM constellation with a=10, b=2 and α=8.6 deg.
Figure 4:
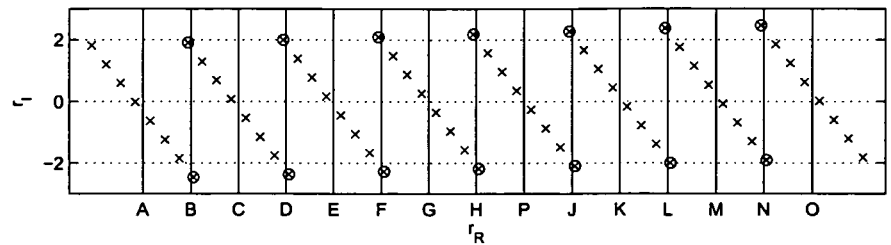
FIG. 4 illustrates the decision regions for a 1-dim demapper for a CRCQD 64-QAM constellation with a=10, b=2 and α=8.6 deg.

In the following, without loss of generality we consider the case A≥B, i.e. the channel provides a larger gain on the real axis than on the imaginary axis, as in the example of FIG. 3. For example, consider the problem of finding the closest point to r among all the constellation points of FIG. 3. In FIG. 4 the plane is split into sectors delimited by the vertical lines with real components $m_c$, with c=1, 2, . . . , μ. Then we first identify the sector boundary $\overline{m}$ closest to the received point r by comparing its real component with the $\{m_c\}$ values and then we compute the distance with respect to the constellation points belonging to the two sectors adjacent to the found boundary. With reference to FIG. 4, if $\overline{m}=m_2$ we compute the distance with respect to all the points having real component between $m_1$ and $m_3$. If $\overline{m}=m_5$ we consider all the points with real component between $m_4$ and $m_6$, including the two points indicated with circles that do not belong to the same diagonal line of the other points. This procedure greatly reduces the number of computed distance since we have to compute at most $\sqrt{M}$ distances.

For the general case, we first indicate the ordered set of distinct values on the real axis of the QAM constellation points relative to $b_i=k$ as $V(b_i=k)=\{v_1, v_2, \ldots, v_{\mu(b_i=k)}\}$, where $\mu(b_i=k)$ indicates the set cardinality, $$v_c < v_{c+1}, v_c = x_R, \text{ with } x \in C(b_i=k) \quad (11)$$

where $C(b_i=k)$ is the subset of C containing all QAM constellation points associated with $b_i=k$, and c=1, 2, . . . , $\mu(b\_i=k)-1$. We then extend the set $V(b_i=k)$ by including the real components of points in the middle of two boundary values in $V(b_i=k)$, to obtain the ordered set M of size $2\mu(b_i=k)-1$ with elements $$m_c = \begin{cases} v_{(c+1)/2} & c = 1, 3, \ldots, 2\mu(b_i=k)-1, \\ \frac{v_{c/2} + v_{c/2+1}}{2} & c = 2, 4, \ldots, 2(\mu(b_i=k)-1). \end{cases} \quad (12)$$

thus, the thresholds used in the sub-set selection are determined according to the condition and properties of the channel.

1D-DEM comprises two steps: a) we first establish the sector boundary and then b) we evaluate the distance of the points belonging to the two adjacent sectors. In particular, step a) is implemented as follows $$q(b_i=k) = \text{argmin}_{c=1,2,\ldots 2\mu(b_i=k)-1}\{|r_r - m_0 a \cos(\alpha)|^2\}. \quad (13)$$

note that the choice of the axis having the largest gain (as we suppose a>b) ensures the lowest error probability in the interval selection.

For points within the two adjacent sectors we compute the full distance with respect to r and then find the closest point to r. step b) is implemented as follows: when $q(b_i=k)$ is odd we consider the constellation points $$S_i(k) = \{a[\cos(\alpha)m_{q(b_i=k)} - \sin(\alpha)\beta(2c - \sqrt{m}+1)] + jB[\sin(\alpha)m_{q(b_i=k)} + \cos(\alpha)\beta(2c - \sqrt{M}+1)], c=2, \ldots, \sqrt{M}-2\} \cup \{A[\cos(\alpha)m_{q(b_i=k)+1} - \sin(\alpha) \beta(\sqrt{M}-1)] + jB[\sin(\alpha)m_{q(b_i=k)+1} + \cos(\alpha) \beta(\sqrt{M}-1)], A[\cos(\alpha)m_{q(b_i=k)-1} - \sin(\alpha) \beta(-\sqrt{M}+1)] + jB[\sin(\alpha)m_{q(b_i=k)-1} + \cos(\alpha)\beta(-\sqrt{M}+1)]\}, \quad (14a)$$

For $q(b_i=k)$ even we consider the set $$S_i(k) = \left\{ A[\cos(\alpha)m_{q(b_i=k)-1} - \sin(\alpha)\beta(2c - \sqrt{M}+1)] + \right. \quad (14b)$$

-continued
$$jB[\sin(\alpha)m_{q(b_i=k)-1} + \cos(\alpha)\beta(2c - \sqrt{M} + 1)], c = 0, 1, \ldots,$$
$$\frac{\sqrt{M}}{2} - 1\} \cup \{A[\cos(\alpha)m_{q(b_i=k)+1} - \sin(\alpha)\beta(2c - \sqrt{M} + 1)] +$$
$$jB[\sin(\alpha)m_{q(b_i=k)+1} + \cos(\alpha)\beta(2c - \sqrt{M} + 1)],$$
$$c = \frac{\sqrt{M}}{2}, \frac{\sqrt{M}}{2} + 1, \ldots, \sqrt{M} - 1\}.$$

Lastly, we find the closest point as $$\hat{s}_{i,k} = \mathrm{argmin}_{s \in S_i(k)}\{\|r-s\|^2\}. \quad (15)$$

Inversion Demapper (IDEM)

The second reduced-complexity approach for the computation of the minimum distance point is the inversion demapper (IDEM), which reverses the scaling and/or distorsions on the QAM symbol introduced by both CRCQD and the channel. In particular we compute $$r' = \left(\frac{r_R}{A} + j\frac{r_I}{B}\right)e^{-j\alpha} \quad (16)$$

and then use a regular QAM constellation for detection, i.e.

$$\hat{s}_{i,k} = \mathrm{argmin}_{s \in C(b_j=k)}\{\|r'-s\|^2\}. \quad (17)$$

In order to avoid divisions that require more sophisticated hardware, (16) and (17) can be also be rewritten as follows $$r'' = (Br_R + jAr_I)e^{-j\alpha} \quad (18)$$

and then use a regular QAM constellation for detection, i.e.

$$\hat{s}_{i,k} = \mathrm{argmin}_{s \in C(b_j=k)}\{\|r''-ABs\|^2\}. \quad (19)$$

In this case, the sets $S_{i(k)}$ comprises only one element, that can be determined by a simple dichotomic search over the received sample, without the need of computing all distances.

Note that this approach is suboptimal since the distance of r with respect to the points of $\overline{C}(b_j=k)$ is not the same as the distance of r' with respect to the points of $C(b_j=k)$ and therefore in some cases $\hat{s}_{i,k}$ computed with (17) may not coincide with the point obtained with the 2D-DEM.

Numerical Results

We have first evaluated the performance of the proposed demappers in terms of uncoded bit error rate (BER) on a channel with additive white Gaussian noise (AWGN) as a function of A/B, with B=1. Perfect channel knowledge is assumed and a 64-QAM with $\alpha$=8.6 deg is considered. For an ideal channel the signal to noise ratio (SNR) is 20 dB. We also report the performance of a demapper that exploits only the strongest component of r and we denote it PAM demapper. For example, if A>B, the real part of r is considered and this approach may be suitable when an erasure of the imaginary axis occurs and demapping is performed as follows $$\hat{s}_{i,k} = \mathrm{argmin}_{s \in \overline{C}(b_j=k)}\|r_R - s_R\|^2. \quad (20)$$

Figure 5:
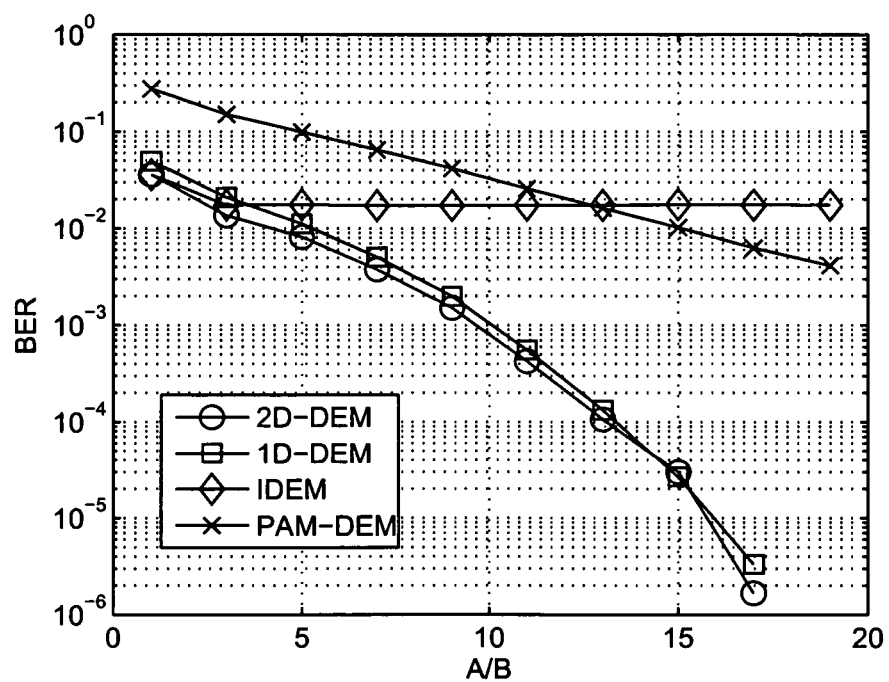
FIG. 5 shows, in graphical form, the average bit error rate (BER) as a function of a/b and a S/N ratio for a=b=1 of 20 db

FIG. 5 shows the BER for the various demappers. We note that the best performance is provided by 2D-DEM. IDEM has the same performance for small values of A, while 1D-DEM exhibits a constant gap with respect to 2D-DEM. Lastly, note that PAM-DEM always performs significantly worse than the other demappers, and therefore we conclude that it can be used only when an erasure occurs, when it becomes equivalent to 2D-DEM.

We also evaluated the performance of the considered demappers for a Rayleigh channel in a complete DVB-T2 system, including time, frequency and bit interleaving and low density parity check (LDPC) codes.

Tab. I shows the minimum required SNR to achieve a BER of $10^{-4}$ at the output of the LDPC decoder with a 16K code block length, for the CRCQD transmission based on the 16-QAM with $\alpha$=16.8 deg and for various LDPC code rates. We observe that 1D-DEM yields the same performance of the optimal 2D-DEM, while IDEM has a loss of 1÷2 dB with respect to 2D-DEM. Results for PAM-DEM are not reported as the required SNR is over 40 dB for all configuration, hence we conclude that PAM-DEM is not suited for DVB-T2.

TABLE I

Required SNR to obtain BER = $10^{-4}$ at the output of the LDPC decoder

| Code Rate | 2D-DEM | IDEM | 1D-DEM |
|---|---|---|---|
| 1/2 | 7.6 | 8.7 | 7.6 |
| 3/5 | 10.3 | 11.8 | 10.3 |
| 2/3 | 11.7 | 13.3 | 11.8 |
| 3/4 | 13.2 | 15.4 | 13.4 |
| 4/5 | 14.5 | 16.7 | 14.6 |
| 5/6 | 15.4 | 17.9 | 15.6 |

TABLE II

Complexity Comparison

| | | | | | 256 QAM | | | |
|---|---|---|---|---|---|---|---|---|
| Scheme | FD | RM | RS | COMP | FD | RM | RS | COMP |
| 2D-DEM | M | 2 + 3M | 2M | M | 256 | 770 | 512 | 256 |
| DEM | M' | 2 + 3M' | 2M' | M' + 4 | 81 | 245 | 162 | 85 |
| 1D-DEM | $\sqrt{M}$ | 4 + 2$\sqrt{M}$ | 2 + 2$\sqrt{M}$ | $\sqrt{M}$ | 16 | 36 | 34 | 16 |
| IDEM | 1 | 10 | 4 | 0 | 1 | 10 | 4 | 0 |
| PAM-DEM | 1 | 2 | 1 | $\log_2(M)$ | 1 | 2 | 1 | 8 |

Complexity

We now consider in details the complexity of each demapper. The complexity of the various algorithms can be first evaluated by the number of points over which we evaluate the full distance (FD). Then, a more in-depth analysis is provided by the number of real multiplications (RM), real sums (RS) and comparisons (COMP) entangled by the various approaches. Many of the considered demappers perform a search over an equi-spaced set (DSES)—e.g. looking for the nearest integer to a real value—to find the minimum distance point. We observe that DSES entails only one multiplication (1 RM) as computational complexity.

2D-DEM: First note that we can divide r by A thus eliminating one parameter and considering only the parameter B/A (2 RM). Then we must compute all M points of the constellation $\hat{C}$, requiring M RM (single parameter scaling). The distances with respect to all points (2M RM and 2M RS) are then computed and compared (M COMP). Therefore for the 2D-DEM we have M FD computations, as can be seen from (10).

1D-DEM We first find the region on the real axis solving a DSES problem (1 RM), then compute the coordinate on the rotated and stretched imaginary axis projection (4 RM, 2 RS). We compute the distance with respect to closest points ($2\sqrt{M}$ RM and $2\sqrt{M}$ RS), which must then be compared ($\sqrt{M}$ COMP). Therefore 1D-DEM requires $\sqrt{M}$ FD computations as can be seen from (14).

IDEM In this case we first divide the real and imaginary part of r by A and B, respectively, and the invert the rotation the received point (6 RM, 2 RS), then demap a QAM with two DSESs problem (2 RM). Lastly, we compute the distance with the found point (2 RM and 2 RS). In this case we have 1 FD computation.

DEM First note that we can divide r by A thus eliminating a parameter and considering only B/A as parameter (2 RM). We then have to find the sub-region (4 COMP), $M'=(\sqrt{M}/2+1)^2$ points per subregion. We compute M' points of the constellation $\overline{C}$, requiring M' RM (single parameter scaling) and the distance with respect to all points (2M' RM and 2M' RS). Lastly, we compare the distances (M' COMP). In this case we have M' FD computations.

PAM demapper For the PAM demapper we divide the real part of r by A (1 RM), find the closest point among M values by a dichotomic search ($\log_2(M)$ COMP) and compute the distance (1 RS and 1 RM), thus requiring 1 FD computation.

Complexities of the various techniques are summarized in Tab. II, which also reports the required RM, RS and COMP for the specific case of a CRCQD 256-QAM constellation. From the table we note that 1D-DEM yields a significant reduction of complexity, requiring only 16 evaluation of distances instead of the 256 required by the 2D-DEM. The IDEM and PAM-DEM have the lowest complexity, however their performance is not satisfactory for DVB-T2 applications. Therefore, we conclude that 1 D-DEM provides the best trade-off as it significantly reduces complexity while having a negligible performance loss.

Conclusions

The present invention relates to a low-complexity method to process a OFDM signal and to the corresponding processing circuit. In particular, an aim of the present invention is to provide a soft CRCQD demappers that reduces the number of points considered for distance calculation. Both the complexity and the performance of the proposed approaches have been evaluated in a DVB-T2 scenario, showing the merits of the solutions over existing demappers.

The invention claimed is:

1. A method of processing a signal received through a channel and modulated according to a modulation scheme that involves a constellation of symbols representing groups of bits, comprising the steps of:
    filtering and demodulating the signal;
    extracting a sample of the demodulated signal;
    splitting a constellation plane into sectors delimited by thresholds on a real component or on an imaginary component,
    identifying a sector boundary closest to the sample,
    selecting a subset of constellation points belonging to two sectors adjacent to the identified sector boundary,
    computing distances of the sample from the selected constellation points; and
    demapping the sample based on the computed distances without using the points of the constellation not included in said subset.

2. The method of claim 1, wherein said sectors are delimited by thresholds in the real and the imaginary components providing a largest gain in the channel.

3. The method of claim 1, wherein the selecting step extracts, from the constellation, for every bit in the sample of the demodulated signal, a first sub-set associated to i-th transmitted bit, of the constellation points having a high probability of having been transmitted assuming the i-th transmitted bit equal to 0, and a second sub-set associated to i-th transmitted bit, of the constellation points having an high probability of having been transmitted assuming the i-th transmitted bit equal to 1.

4. The method of claim 1, including a step of determining said thresholds according to conditions of the channel.

5. The method of claim 1, wherein the step of demapping includes computing log-likelihood ratios relative to values of bits in the sample.

6. The method of claim 1, wherein the step of demapping includes computing a shortest distance between the sample and the constellation points in the subset corresponding to values '0' and '1' of a bit.

7. The method of claim 1, wherein demapping includes the step of reverting scaling and/or distortion in the channel.

* * * * *